United States Patent
Sasaki et al.

(10) Patent No.: US 7,283,279 B2
(45) Date of Patent: Oct. 16, 2007

(54) SCANNER SYSTEM AND SCANNER DRIVER

(75) Inventors: Wataru Sasaki, Osaka (JP); Tatsuo Noda, Osaka (JP); Kiyoshi Hori, Osaka (JP); Tokimune Nagayama, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 31 days.

(21) Appl. No.: 11/144,660

(22) Filed: Jun. 6, 2005

(65) Prior Publication Data
US 2005/0219657 A1    Oct. 6, 2005

Related U.S. Application Data

(62) Division of application No. 09/928,483, filed on Aug. 14, 2001, now Pat. No. 7,116,439.

(30) Foreign Application Priority Data

| | | | |
|---|---|---|---|
| Aug. 31, 2000 | (JP) | | 2000-262075 |
| Oct. 17, 2000 | (JP) | | 2000-316368 |

(51) Int. Cl.
*H04N 1/00* (2006.01)
(52) U.S. Cl. .................. 358/1.18; 358/434; 358/468
(58) Field of Classification Search .............. 358/1.1, 358/1.9, 1.12, 1.18, 434, 438, 449, 474, 488, 358/435, 436, 437, 439, 468; 382/296, 297
See application file for complete search history.

(56) References Cited

U.S. PATENT DOCUMENTS 5,721,423 A * 2/1998 Hamamoto .............. 250/208.1
5,778,276 A    7/1998 Hasegawa
6,304,681 B1   10/2001 Akiba et al.
6,411,743 B1   6/2002 Koh et al.
6,801,344 B2 * 10/2004 Morinaga et al. ........... 358/474
6,842,265 B1   1/2005 Votipka et al.
6,859,287 B1   2/2005 Frederiksen et al.

FOREIGN PATENT DOCUMENTS

| JP | 63-191470 | 8/1988 |
|---|---|---|
| JP | 6-215113 | 8/1994 |
| JP | 11-73487 | 3/1999 |
| JP | 11-122434 | 4/1999 |
| JP | 11-122437 | 4/1999 |
| JP | 11-175696 | 7/1999 |
| JP | 2000-32221 | 1/2000 |
| JP | 2000-134427 | 5/2000 |

OTHER PUBLICATIONS

Japanese Office Action (with partial English translation) for Application No. 2001-256361 (Jun. 23, 2004).

* cited by examiner

*Primary Examiner*—Thomas D. Lee
(74) *Attorney, Agent, or Firm*—Smith, Gambrell, & Russell, LLP

(57) ABSTRACT

A scanner system having an image scanner and a control device for controlling the image scanner. The control device has a scanner driver installed thereinto. The operator can carry out entering for setting a reading size and a direction of an original on the operation screen of the scanner driver. The control device designates a reading area of the original based on the inputs of the reading size and the direction of the original and outputs a scanning execution instruction to the image scanner.

7 Claims, 14 Drawing Sheets

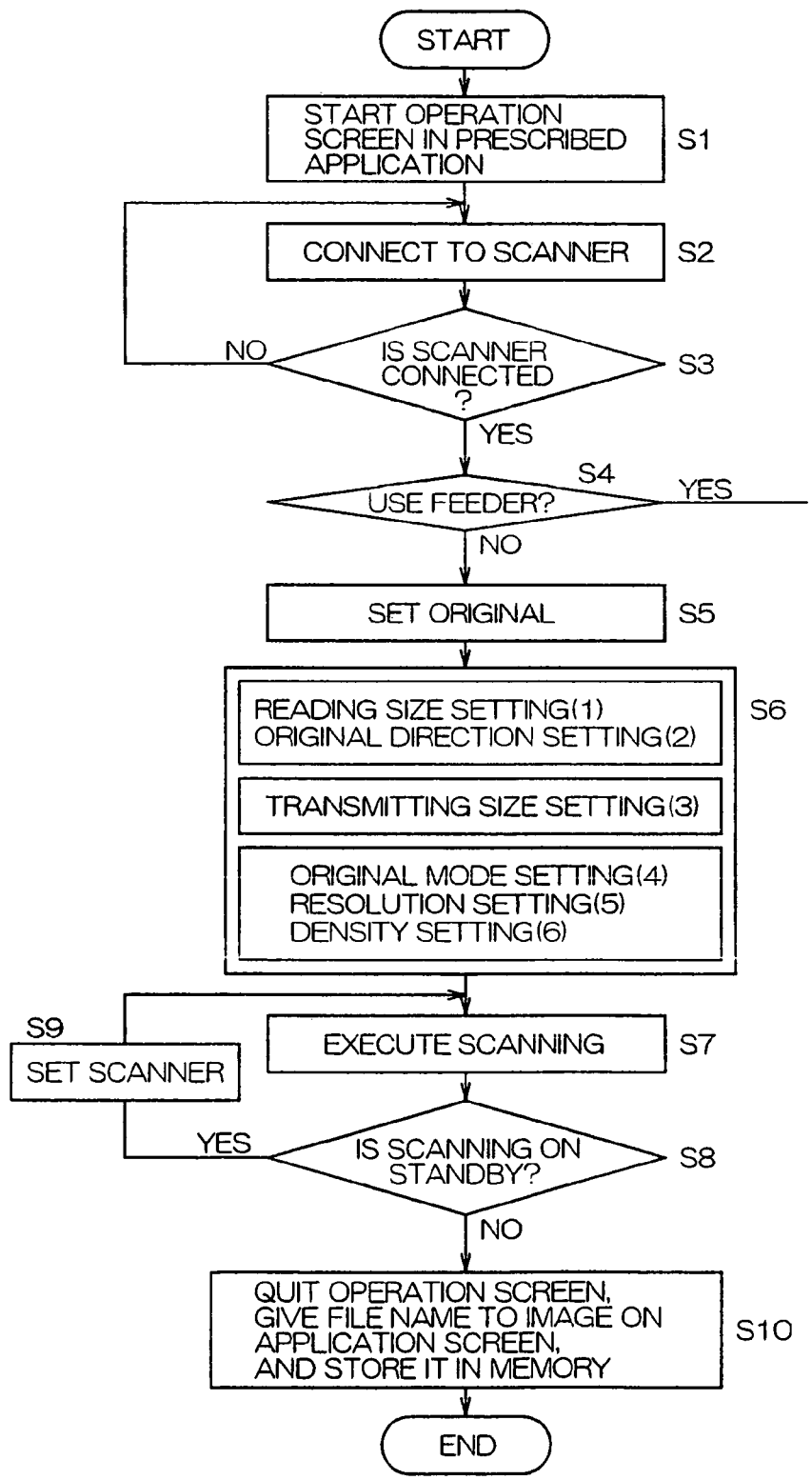

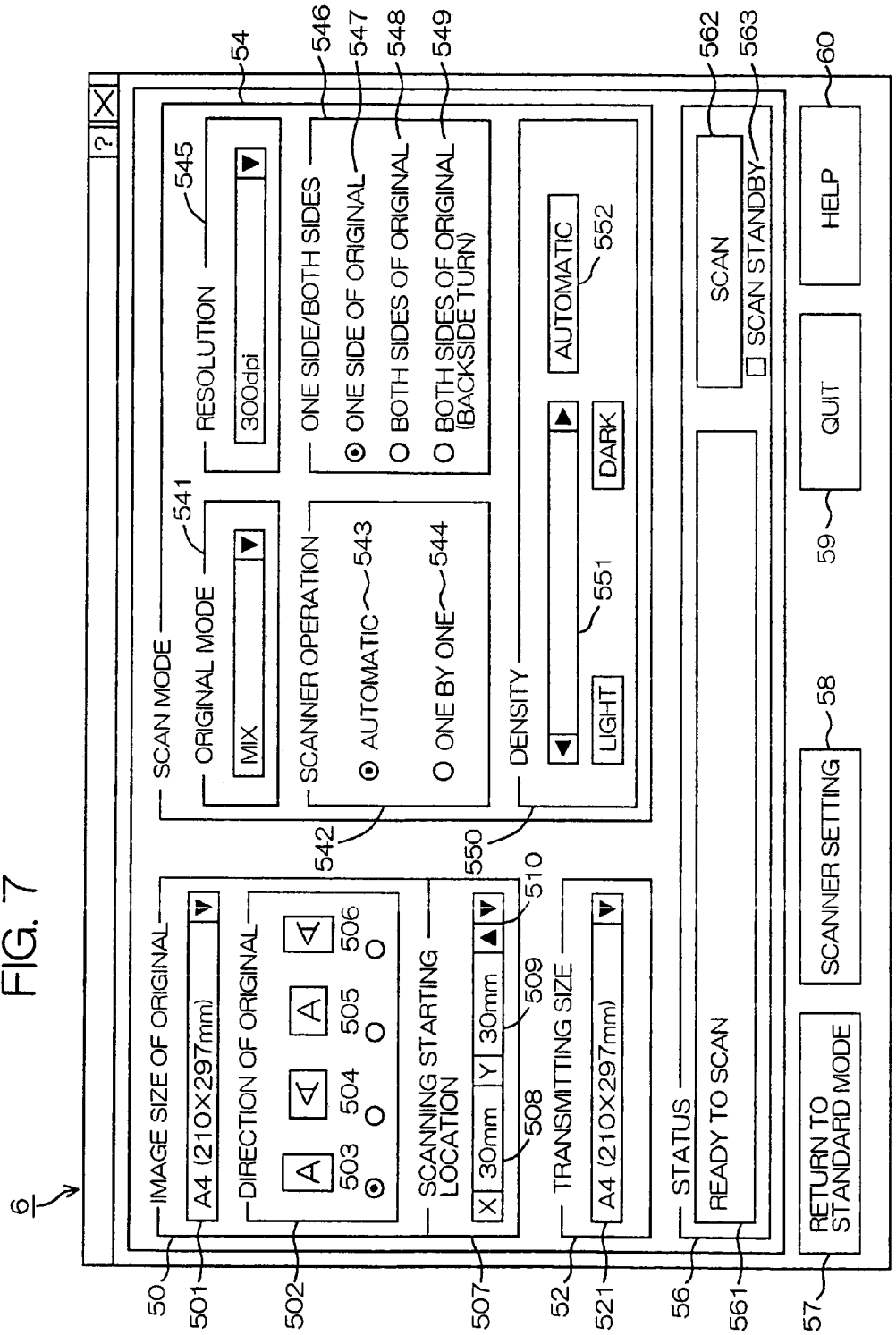

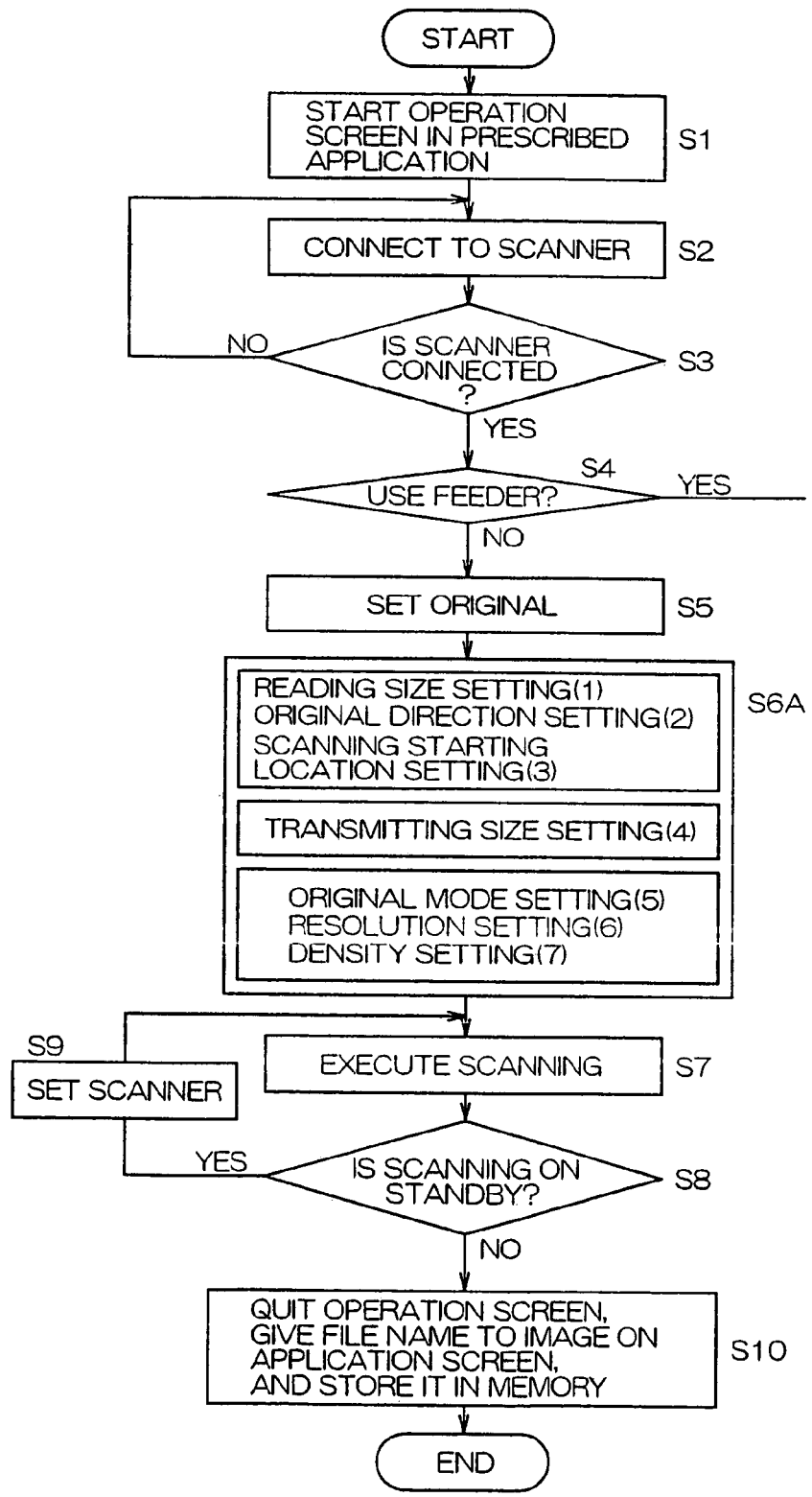

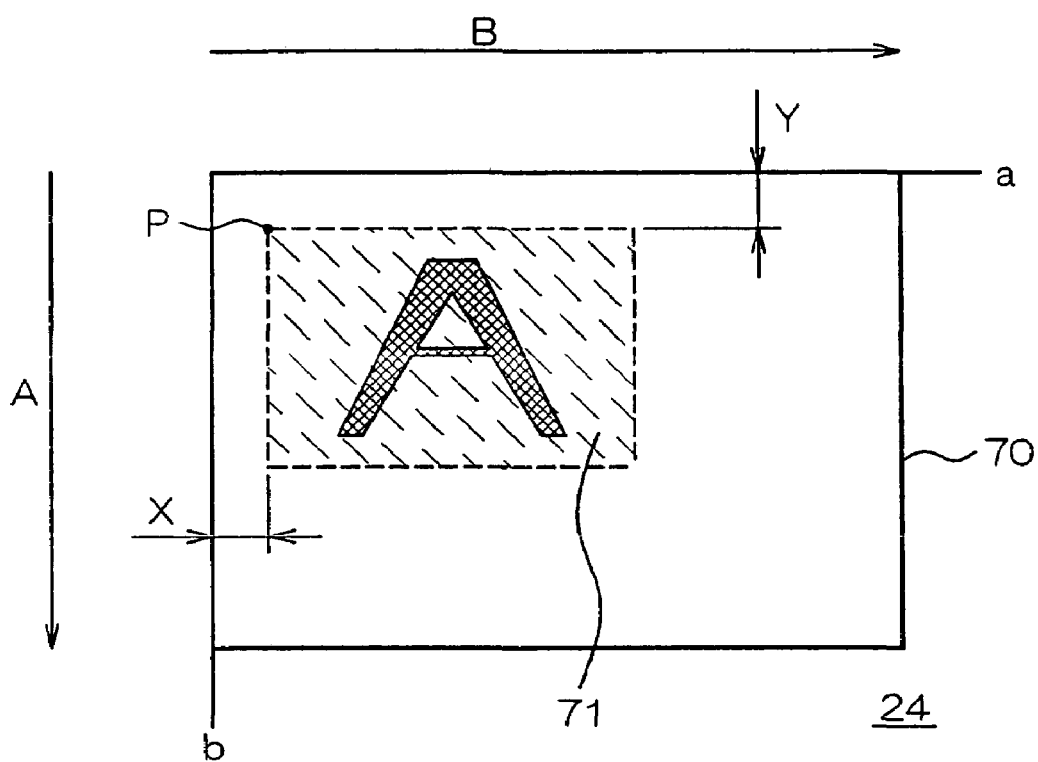

SCANNER SYSTEM AND SCANNER DRIVER

CROSS-REFERENCE TO RELATED APPLICATION

This is a divisional application of application Ser. No. 09/928,483 filed Aug. 14, 2001 now U.S. Pat. No. 7,116,439, which is being incorporated in its entirety herein by reference.

BACKGROUND OF THE INVENTION

1. Field of the Invention

The present invention relates to a scanner system using a scanning device that can be connected to a computer, a scanner control device for controlling the scanning device by remote control, and a recording medium having a program recorded therein for making the computer function as the scanner control device.

The scanning device refers not only to scanning devices used as computer peripheral devices, but also to scanning devices incorporated in information-related devices such as digital duplicators and facsimiles.

2. Description of Related Arts

When a scanning device is used for obtaining image data of a desired area of a sheet original or a book-style original, it is occasionally impossible to scan only the necessary area. In such a case, after the whole image is once scanned, an operation for cutting out the necessary part is carried out on the computer screen, and then the image data is stored in a prescribed memory area in a desired file format. Or, the whole image that has been scanned is once saved in a prescribed memory area of the computer in a desired file format, and the saved file is read out afterwards so that the necessary part is cut out and then saved again.

Meanwhile, an example in which a scanner 100 is used is shown in FIG. 15. The scanner 100 is capable of having an original of up to A3 in size placed on its scanning window 101. In this example, an image displayed on a monitor screen 111 of a computer 110 when an A4-sized book 103 is opened and only the right page thereof is scanned is shown.

Since the scanner 100 has its main scanning direction being the direction of an arrow A, and its subscanning direction being the direction of an arrow B, when the right page of the book 103 is scanned, an image that has been turned 90° from the original image is displayed on the monitor screen 111. If a figure or a photograph whose vertical and horizontal directions cannot be judged from the appearance is saved in such a state, it is impossible to determine which is vertical or horizontal when the saved file is opened later. In addition, for example, when the scanned image is a document and is to be processed by the OCR processing, it needs to be rotated 90° rightward. Therefore, when an image is turned on its side, or turned upside down, generally the image is subjected to a rotating processing on the computer in the same way as in the case of cutting out an image.

In order to carry out the operation for cutting out a necessary part of the scanned image data and the operation for turning the image on the computer as described above, the operator needs to switch the screen alternately between a scanning instruction screen of the scanner driver and an image processing screen for processing the image as mentioned above. Otherwise, after completion of all the scanning instructions and saving the data in a file, the operator needs to read out the file again so as to process the image as mentioned above. For this reason, the number of operations increases, which is inconvenient. Also, when the whole image of an original including an extremely large quantity of data such as a photograph is to be saved, for example, in a floppy disc, it is often the case that the data is too much to be saved in the floppy disc, or even if the data can be saved, images of other originals cannot be additionally saved.

In the case of a network scanner that transmits image data to a computer via a network, when the image data includes a photo image having a large quantity of data, due to the excessive load on the network, the transmission takes such a long time that it hinders transmission between other devices.

Meanwhile, when image data of an original is scanned by a scanning device so as to be fetched by a computer connected to the scanner, first, the original is set on the scanning device, scanning condition setting is carried out thereafter on the operation screen of a scanner driver installed in the computer. Then, a scan execution instruction is directed from the operation screen, thereby making the scanning device operate scanning.

However, in today's offices, a plural number of computers have been connected with one another through a network so as to share the use of a scanning device. Accordingly, in many cases, such offices locate the scanning device apart from the computers. In addition, an increasing number of recent digital duplicators and facsimile machines are provided with a network scanner function in their scanner sections. In order to avoid noises, such digital duplicators and facsimiles are placed in rooms separate from the computers in many cases. Accordingly, in order to feed a computer with images of originals by such a scanning device, the operator needs to shuttle a number of times between the computer and the scanning device that are placed apart from each other for setting up the devices and setting originals, which is inefficient.

Since digital duplicators and recent scanning devices are provided with a sheet feeder that automatically feeds sheet originals one by one for scanning, they can be operated by remote control from the side of a computer. However, when the original is a book, the binding part between the spread two pages is likely to be apart from the surface of the scanning window of the scanning device. As a result, inconvenience as the following tends to arise: a part of the image in the vicinity of the binding part has distortion, which brings the part into a blurred condition, or the part is darkened due to its farness from the scanning light. In order to avoid such problems, another operator needs to press the book from its top so as to keep the binding part of the book in contact with the scanning window during the scanning.

An example in which an operator carries out scanning of a sheet original by using a scanning device is explained (Refer to FIG. 16). First, the operator activates the operation screen of a scanner driver installed in a computer (Step R1), then the operator moves to the scanning device to set an original in the sheet feeder (Step R2). The operator then returns to the computer to set scanning conditions and execute scanning (Step R3) After completion of the scanning, the operator moves to the scanning device to withdraw the original so as not to leave it as an obstacle for other users (Step R4). Then, the operator returns to the computer to create a file to store the image of the original and save the image data (Step R5).

In the above case, the operator needs to travel from the computer to the scanning device or from the scanning device to the computer in every interval between the steps, that is, the operator needs to move four times. Besides that, when the original is a book as mentioned above, each of the computer and the scanning device needs one operator. Furthermore, in the case of each of the devices being located separately in a different room, one more shuttling for checking whether the original has been set or not is additionally required.

SUMMARY OF THE INVENTION

It is an object of the present invention to provide a scanner system capable of extracting only a necessary part of an original and scanning it by simple operation, and a scanner driver for implementing the scanner system.

Another object of the present invention is to provide a scanner system capable of carrying out scanning without requiring previous processing such as image rotating processing prior to image processing such as the OCR processing when such image processing is to be performed, and a scanner driver for implementing the scanner system.

Further object of the present invention is to provide a scanner system capable of reducing the number of shuttling of the operator between the computer and the scanner and a scanner driver for implementing the scanner system.

A still further object of the present invention is to provide a scanner system that allows the operator to operate scanning of an original with a special configuration such as a book without aid of a cooperator, and a scanner driver for implementing the scanner system.

The scanner driver may be provided in such a manner that it is recorded in a recording medium that can be read by computers. The recording medium may be an optical disc, a magneto-optical disc, or a magnetic disc. Also, the scanner driver may be provided by means of transmission, in which the scanner driver is transmitted via a communication line (that may be either wired or wireless) in the form of light signals or electrical signals.

The scanner system according to the first aspect of the present invention comprises an image scanner for scanning image data of an original, and a control device for controlling the image scanner, wherein the control device comprises first setting means for accepting input for setting a reading size of the original, second setting means for accepting input for setting a direction of the original, and scanning instruction means for designating a reading area of the original based on the inputs of the reading size and the direction of the original that have been accepted by the first and second setting means, and outputting a scan execution instruction to the image scanner.

According to the above system, a necessary reading area and a correct image direction can be designated only by setting a reading size and a direction of the original. This makes it possible to minimize the memory area for storing image data on the side of the control device, and eliminates necessity for cutting out or rotating images that have been saved.

The reading area above may be set by designating an end part of the readable area as the end part of the reading area.

According to this arrangement, in the case of scanning an original whose necessary reading area is located adjacent to an end of the original such as in the case where only one side of a two-page spread original such as a book is scanned, the operator only needs to put the page to be scanned along an end part of the scanning window that coincides with an end part of the area readable by the scanner. Setting of originals is therefore easy.

The above control device is preferably be further provided with third setting means for setting a scanning starting location or a scanning ending location of the reading area.

In such a structure, when the area that needs to be scanned is located inside the edges of the original, it can be scanned in a desired manner by specifying the scanning starting location or the scanning ending location.

The scanner system according to the second aspect of this invention comprises an image scanner for scanning image data of an original, and a control device for controlling the image scanner, wherein: the control device comprises scanning instruction means including means for setting a scanning execution standby mode for accepting input for bringing an instruction for executing scanning of the original to be directed to the image scanner into a standby state, and transmission means for transmitting the scan execution instruction that has been brought into the standby state to the image scanner. The image scanner comprises receiving means for receiving the scan execution instruction that has been brought into the standby state from the transmission means, and scanning initiating means for releasing the scan execution instruction received by the receiving means from the standby state so as to initiate scanning of the original.

According to the above system, it is possible for the control device such as a computer to temporarily hold the scanner in a scanning standby state in order to set the original or for other purposes. This enables the operator to terminate the standby state and execute scanning on the spot after moving to the side of the scanning device and setting the original. Image forming devices including digital duplicators having a network scanner function are collectively referred to as the "scanning device".

Accordingly, the operator is spared the returning move to the control device for directing a scan execution instruction. In addition, in the case of scanning a book-style original, the operator can carry out scanning single-handedly without aid of a cooperator. Moreover, the operator can bring the original back upon completion of the scanning so that a shuttling for withdrawing the original can be omitted.

It is preferable for the above scanning device to include means for changing scanning conditions, which can modify the scanning conditions that have been designated by the control device above.

Such a structure as above allows the operator to change the settings that have been made on the side of the control device without needing to return to the control device when such need arises for some reason upon setting of the original on the scanning device.

The above and further objects, features and effects of the present invention will be apparent from the following description of preferred embodiments referring to the accompanying drawings.

BRIEF DESCRIPTION OF THE DRAWINGS

FIG. 5 is a flow chart showing an example of the flow of image input processing.

FIG. 7 is a diagram showing an example of the operation screen in the scanner driver used in the scanner system according to a second embodiment of this invention.

FIG. 8 is a flow chart showing an example of the flow of image input processing in the second embodiment of this invention.

FIG. 9 is a diagram illustrating an example of the scanner section of the second embodiment of this invention in a state of reading in an original.

DESCRIPTION OF THE PREFERRED EMBODIMENTS

Figure 1:
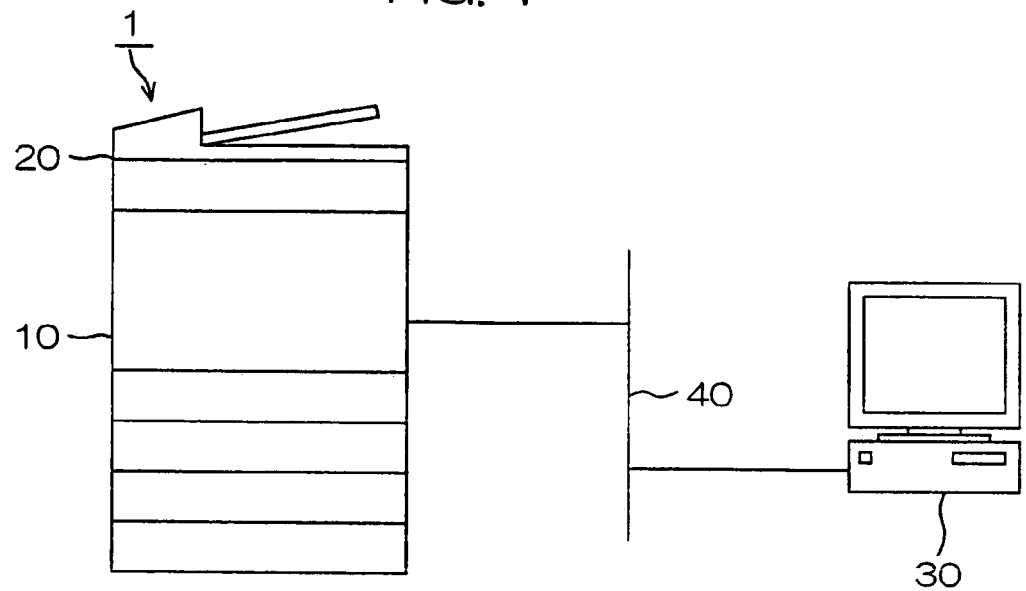
FIG. 1 is a diagram showing the whole structure of a scanner system according to an embodiment of the present invention.

FIG. 1 illustrates the structure of a scanner system according to a first embodiment of the present invention. This scanner system comprises a digital duplicator 1 as an example of scanning devices, and a computer 30 connected to the digital duplicator 1 through a network 40. The digital duplicator 1 has a network scanning function and includes a scanner section 20 for reading in the image of an original as digital information, which is provided on its main body 10. The scanner section 20 is connected to the network 40 through an interface. The computer 30 in which a driver software for the scanner section 20 has been installed is connected to the network 40 through an interface. To the network 40, a plurality of other computers not shown in the Figure are also connected so as to form a LAN.

Figure 2:
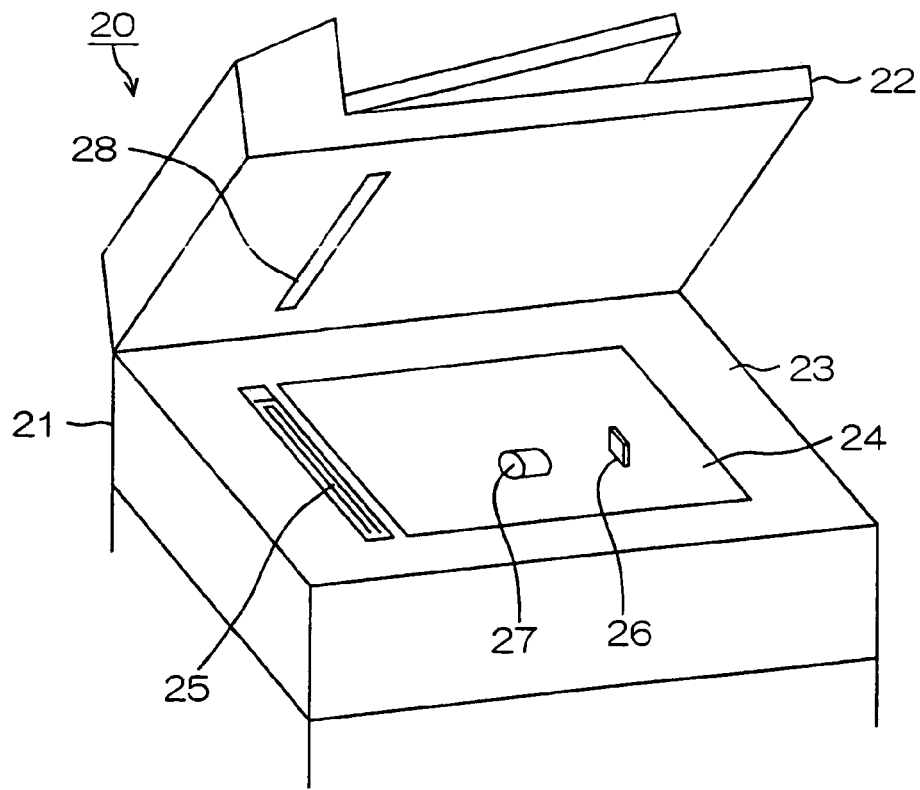
FIG. 2 is a perspective view of the scanner section constituting the above scanner system.

FIG. 2 is a schematic perspective view showing the structure of the scanner section 20. The scanner section 20 comprises a scanning part 21 fixed in the upper portion of the digital duplicator and a feeder 22 disposed above the scanning part 21 whose innermost side is connected with the scanning part 21 by hinges or the like so as to be opened or closed. The upper part of the scanning part 21 comprises an original-placing table 23 which has an opening provided with a glass plate fitted therein, thereby forming a scanning window 24. The scanning part 21 has in its inside a lamp-mirror group 25 for illuminating and scanning an original on the scanning window at a prescribed speed, an image sensor 26 comprising CCD or the like, and a lens 27 for converging an optical image that has been deflected in the direction of the image sensor 26 by the lamp-mirror group 25 toward the image sensor 26.

The feeder 22 is a device for automatically feeding sheet originals onto the scanning window 24 and is used being laid on the original-placing table 23. Sheet originals are separated and conveyed sheet by sheet by the feeder 22 and pass through an elongated window (platen part 28) in the bottom of the feeder 22 disposed perpendicularly to the feeding direction so that each of the sheet originals is exposed to the strip-shaped part of the scanning window 24 located on the left side in the Figure with the side for scanning being directed downward. At this point, instead of the movement of the lamp-mirror group 25, the sheet original passes through the platen part 28 at a prescribed speed so as to be exposed and scanned. An optical image is directed toward the image sensor 26 by the lamp-mirror group 25 that keeps irradiating light while staying at the position facing the platen part 28 so that the optical image being sent to the image sensor 26 at the same speed as the speed of the sheet original passing through the platen part 28 is read in by the image sensor 26 at the same speed.

Figure 3:
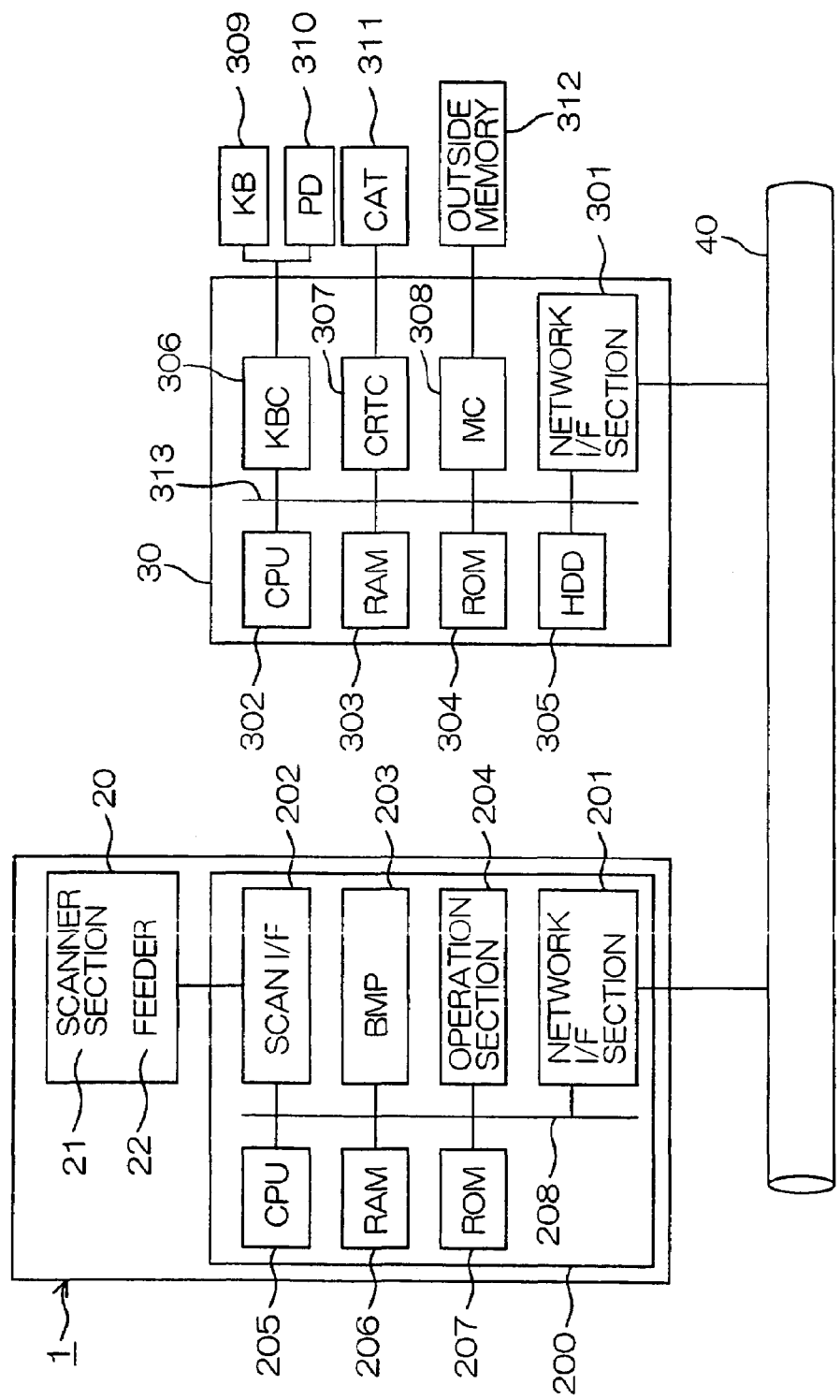
FIG. 3 is a block diagram illustrating the electrical arrangement of the above scanner system.

FIG. 3 is a block diagram illustrating the electrical structure of the scanner system according to this embodiment. This scanner system comprises the digital duplicator 1 including the scanner section 20, and the computer 30. The digital duplicator 1 and the computer 30 are connected to the network 40 such as an Ethernet via network interface sections (I/F) 201 and 301, respectively, which control communication with the network 40. In this way, the digital duplicator 1 and the computer 30 are interconnected via the network 40 so that information directed from the computer 30 can be transmitted to the digital duplicator 1 and image information from the digital duplicator 1 can be transmitted to the computer 30.

In addition, the network interface (I/F) section 301 can function as transmission means for transmitting a scan execution instruction that has been in a standby state to the digital duplicator 1 serving as a scanning device. Also, the network interface (I/F) section 201 can serve as receiving means for receiving a scan execution instruction that has been in a standby state from the computer 30 serving as an instruction device.

A circuit 200 on the side of the digital duplicator 1 includes a scan interface (I/F) 202, a bitmap memory (BMP) 203, an operation section 204, the network interface (I/F) 201, a CPU 205, a RAM 206, and a ROM 207. The scan I/F 202 is, for example, a video interface exclusively used for this system, which controls data transmission to or from the scanner section 20 that is connected via this interface. The bitmap memory (BMP) 203 temporarily saves image data that has been transferred from the scanner section 20 in the bitmap form.

The CPU 205 performs various kinds of control based on control programs and various data stored in ROM 207, and controls each device through a main bus (MB) 208, as well as performs overall control of the whole digital duplicator 1 including the scanner section 20. The RAM 206 provides the work area of the CPU 205. The image data being temporarily saved in the BMP 203 is read out by the CPU 205 and subjected to processing for cutting out a designated area or rotating the image according to the need. Furthermore, the image data is transferred to the computer 30 in accordance with a prescribed procedure via the MB 208, the network I/F section 201, and the network 40.

In the operation section 204, instructing operations such as input of various settings for the digital duplicator 1 and initiation of copying and the like are carried out. Setting the conditions of the scanning part and initiation of scanning can also be performed by this operation section 204. In addition, this operation section 204 comprises scan initiating means capable of releasing a scan execution instruction from a standby state so as to start execution of scanning and means for changing scanning conditions capable of changing the scanning conditions designated by the computer 30.

The computer 30 comprises inside thereof a CPU 302, a RAM 303, a ROM 304, a hard disc (HDD) 305, a key board controller (KBC) 306, a CRT controller (CRTC) 307, a memory controller (MC) 308, and a network I/F section 301. Also, there are a key board (KB) 309, a pointing device (PD) 310, a CRT display (CRT) 311, and an outside memory device 312 including an MO drive device and a floppy disc drive device provided outside the computer 30. These are connected to their respective controllers inside the computer 30, namely, the keyboard controller (KBC) 306, the CRT controller (CRTC) 307, and the memory controller (MC) 308, in the manner shown in FIG. 3.

The CPU 302 performs various control based on control programs and various data stored in the ROM 304 or the HDD 305. Also the CPU 302 controls the devices through the main bus (MB) 313, and performs overall control of the computer 30. The RAM 303 provides the working area of the CPU 302 and is capable of temporarily storing image data transferred from the digital duplicator 1. The KBC 306 controls input from the keyboard 309 and the pointing device (PD) 310 such as a mouse. CRTC 307 controls display of the CRT. The memory controller (MC) 308 controls access from/to the outside memory 312.

A scanner driver that is used when using the digital duplicator 1 as a network scanner has been installed in the HDD 305 together with, for example, an application software for image management that has a function of filing image data and an image displaying function. This scanner driver is a driver software complying with a standard such as TWAIN. The scanner driver may be preliminarily stored in the HDD 305, or installed in the HDD 305 by being read out from a portable recording medium such as a CD-ROM, or installed in the HDD 305 such that it is downloaded in the computer 30 in the form of signals (electrical signals or light signals) passing through a communication line (wired or wireless line) from a server on a network such as the Internet.

The HDD 305 further includes a prescribed memory area set for storing image data so that image data transferred from the digital duplicator 1 is once stored in the RAM 303 and given an appropriate file name by the filing function of the application software, and then stored in the prescribed memory area in the HDD 305. The image data may also be stored in the outside memory 312 via MC 308.

Image data that has been transferred to the computer 30 is displayed as an actual image on the CRT 311 through the CRTC 307 by means of the image displaying function of the application software. When a file of image data stored in the HDD 305 is read out, an image is displayed on the CRT 311 in the same manner.

Figure 4:
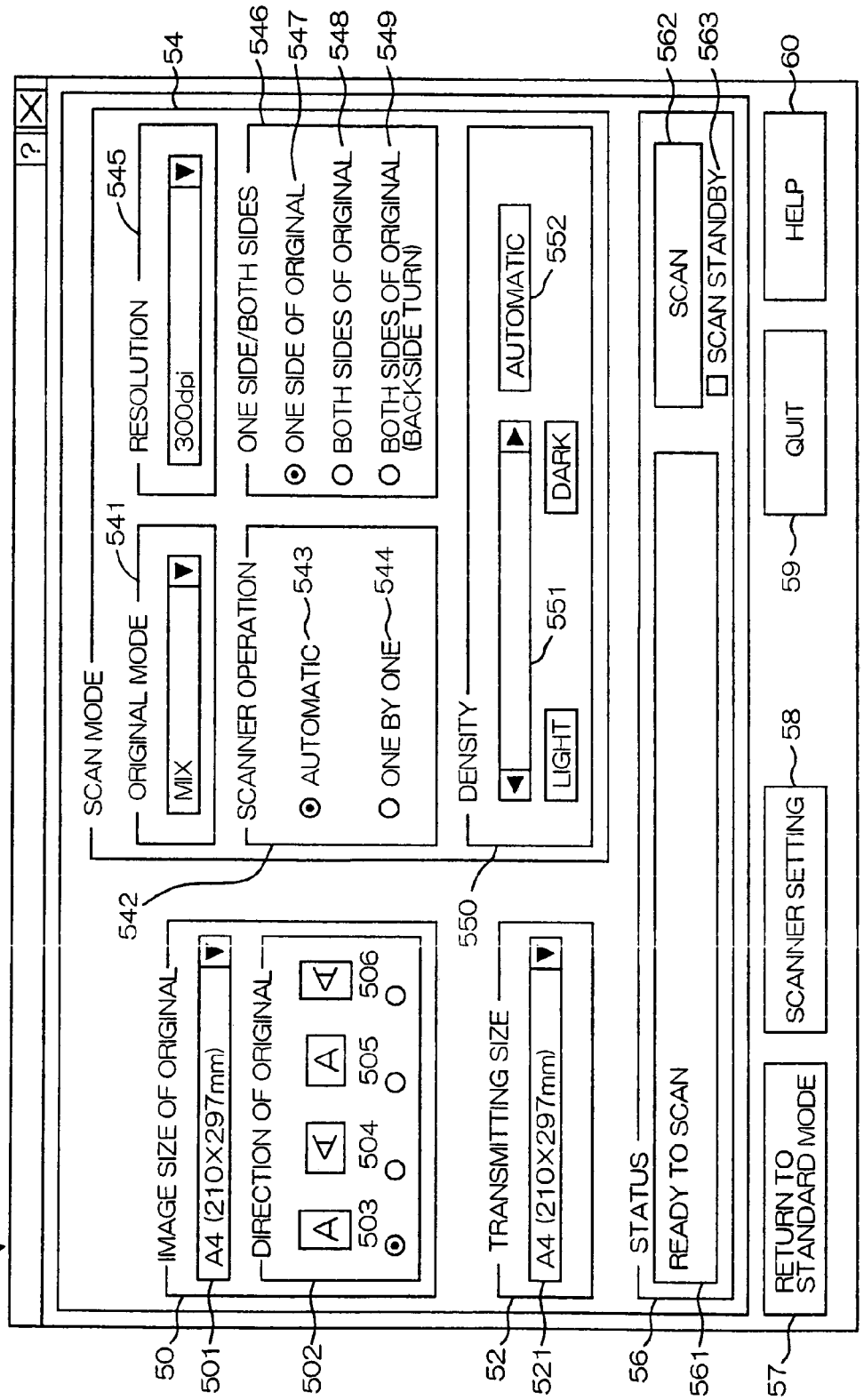
FIG. 4 is a diagram showing an example of the operation screen in the scanner driver used in the above scanner system.

FIG. 4 shows an example of the operation screen of the scanner driver. This operation screen 5 is intended for an operator to set original scanning conditions of the digital duplicator 1 on the computer 30 and instruct the scanner to execute the scanning in accordance with the scanning conditions. This operation screen 5 is activated, for example, through application software and displayed on the CRT 311.

Within the operation screen 5, there are provided an original image setting region 50, a transmitting size setting region 52, a scan mode setting region 54 and a status region 56.

In the original image setting region 50, there are provided image reading size setting means 501 for setting the size of an area of an original desired for scanning and original direction setting means 502 for setting the image direction of the original. In the transmitting size setting region 52, transmitting size setting means 521 for setting the size of the image when it is transmitted to the computer 30 after being scanned by the scanner section 20 is provided. In the Figure, it is specified as A4, which is the same as the original size.

The image reading size setting means 501 is used for designating a mode which is selected from among an automatic mode that designates the size detected by the scanner section 20 as the reading size, a regular size mode such as A3, B4, A4, B5, A5, and B6, and a custom mode that allows arbitral setting of the length and width of the reading size. In FIG. 4, the reading size is specified as a regular size, A4. The original direction setting means 502 is used for selecting one of four combination patterns 503, 504, 505, 506, which are patterns made by combining the figure of the original to be scanned viewed from the operator (the shorter side at the top/the longer side at the top) and the direction of the original viewed from the operator (vertical/horizontal). In FIG. 4, a combination pattern 503 (the shorter side at the top, vertical) is selected.

In the scan mode setting region 54, there are provided original mode setting means 541, scanner operation setting means 542, resolution setting means 545, one side/both sides setting means 546, and density setting means 550.

The original mode setting means 541 is means for setting an optimal error diffusion level when scanning an original. There are provided, for example, a photo mode, a character mode, a mix mode, and an OCR mode. In FIG. 4, the mix mode is selected. The scanner operation setting means 542 is used when sheet originals are set in the feeder 22 and scanned. The scanner operation setting means 542 allows the operator to select either an automatic mode 543 in which a plurality of originals are all fed and scanned in succession, or a one-by-one mode 544 in which originals are fed sheet by sheet so that other settings can be changed for each sheet. In FIG. 4, the automatic mode 543 is selected. The resolution setting means 545 is used for setting the scanning resolution level, and includes setting modes such as 600 dpi, 400 dpi, 300 dpi, and 200 dpi. In FIG. 4, 300 dpi is selected. The one side/both sides setting means 546 is used for selecting a mode, which is determined based on whether the image to be scanned is on one side or both sides of the original. There are provided a one-side-of-original mode 547, both-sides-of-original mode 548, and a both-sides-of-original mode (backside turn) 549 in which the image is made upside down when turned by the feeder 22, and the one-side-of-original mode 547 is selected in FIG. 4. The density setting means 550 is provided with a manual setting section 551 for arbitrarily setting the density of the image and an automatic setting key 552 for automatically setting the exposure of the original.

In the status region 56, a status display section 561, a connection execution key 562, a scanning execution key 562, and a scanning standby setting section 563 (means for setting a scanning standby mode) are provided.

The status display section 561 displays status information such as "CONNECT TO SCANNER", "READY TO SCAN". In FIG. 4, "READY TO SCAN"0 is displayed. The connection execution key 562 is operated when the digital duplicator 1 set in the copy mode is switched into the scanner mode on the computer 30 by remote control so as to be connected to the scanner driver in the computer 30. In this embodiment, the key 562 changes to a scanning execution key (the state in FIG. 4) after the connection is executed.

The scanning standby setting section 563 is used to set a scanning standby mode when operation on the scanner section 20 is called for such as when the original has not been set in the scanner section 20 of the digital duplicator 1, or when the original needs to be replaced with another one. When this scanning standby mode is not set, by pressing the scanning execution key 562, information on the scanning conditions which have been set in the respective setting regions in the operation screen 5 (that is, the original image setting region 50, the transmitting size setting region 52 and the scanning mode setting region 54) together with a scanning execution signal are transmitted to the digital duplicator 1 so that scanning in accordance with the set scanning conditions is executed in the scanner section 20.

On the other hand, the scanning standby setting can be made by checking the checkbox in the scanning standby setting section 563 with the pointing device 310. When the scanning execution key 562 is pressed after setting the scanning standby mode, a scanning execution signal and a scanning standby instruction signal are transmitted to the digital duplicator 1 along with the information on the scanning conditions so that scanning is held in a standby state. In this condition, the scanner operator moves from the side of the computer 30 to the side of the digital duplicator 1, and after preparation on the scanner section 20, the operator can execute scanning on the operation section 204 of the digital duplicator 1.

In addition, in the screen 5, there are provided a key 57 for returning the various settings in the screen 5 to the standard settings, a scanner setting key 58 for opening another page for scanner setting (such as a scanner address setting page, an IP address input page, a divisional management code setting page, and a version display page) an exit key 59 for exiting from this screen 5, and a help key 60.

Figure 6A:
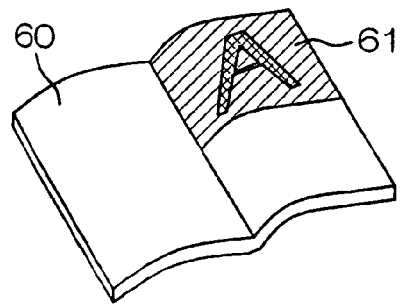
FIGS. 6A-6E are diagrams illustrating setting of an original in the scanner section and its image displayed on a computer display.

FIG. 5 is a flowchart for illustrating an example of the procedure for scanning an image from, an A4-sized book. FIGS. 6A-6E are drawings for explaining the relation between a part of an original to be scanned in the scanner section and the image thereof displayed on the CRT311 of the computer 30. In this example, the upper half of the right page of an opened book 60 is denoted by part 61, which is the part that is supposed to be scanned (FIG. 6A).

Firstly, the operation screen 5 of this scanner driver is activated from a prescribed application on the side of the computer 30 (Step S1). Then, in accordance with the instruction on the status display section 561 indicated as "CONNECT TO SCANNER", the connection execution key 562 is pressed so as to connect the driver to the scanner section of the digital duplicator 1 (Step S2). When the digital duplicator 1 is being used for copying or the like, the operator waits until it is completed and then presses the connection execution key 562 again so as to complete the connection (Step S3). Since the feeder 22 is not used in this case, it is unnecessary to set the scanner operation mode 542 and one side/both sides scanning mode 546. (Step S4). The original is then set on the scanning window 24 in the scanner section 20 (Step S5).

Figure 6B:
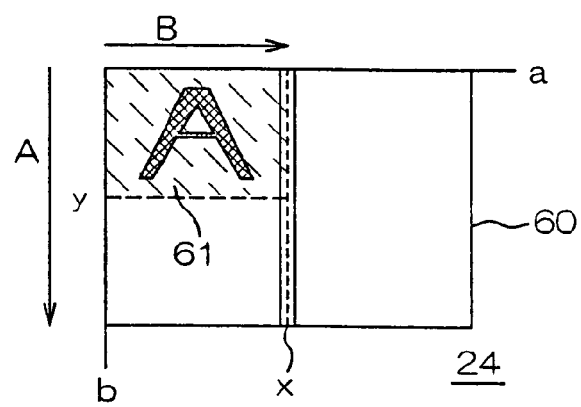

FIG. 6B shows the original that has been set on the scanning window 24. With the book 60 being opened laterally, the part 61 to be scanned is set so as to face the scanning window 24 and along the left end line b and the innermost end line a of the window 24. Then, input for various settings is carried out on the operation screen 5 (Step S6). The original size is set as A5 because this original is half as large as A4 (Setting (1): the image reading size setting means 501 in FIG. 4). The book 60 is set with its topside being located on the innermost side of the machine. The icon 505, of the original direction setting means 502, which corresponds to the above direction viewed from the operator, is therefore selected (Setting (2)).

In the transmitting size setting (3), when the operator wishes to enlarge the original, for example, to A4, A4 is selected, and A5 is selected when the actual size is to be kept. Additionally, settings in the scanning mode region are carried out according to the need (Settings (4), (5), (6)). Subsequently, scanning is executed by the scanning execution key 562 in the operation screen 5 (Step S7). When scanning standby has been set in the scanning standby setting section 563, scanning is executed in the operation section 204 of the digital duplicator 1 (Steps S8, S9).

Figure 6C:
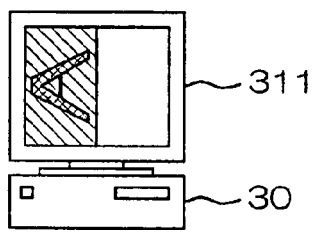

When a scan execution instruction is given to the digital duplicator 1, the lamp-mirror group 25 in the scanner section 20 scans an area that is half as large as the original (which is the area from b to x in FIG. 6B corresponding to A5 reading area). All bit map data resulted from subscanning (in the direction of B) from b to x by the full width in the main scanning direction A is transferred to the bit map memory (BMP)203 in the circuit 200. If the image data is transferred to the computer 30 as it is, the whole area that has been scanned is displayed being turned on its side on the CRT 311 as shown in FIG. 6C. A secondary processing by the computer 30 is therefore necessary. When a photo image or the like in such a condition is saved as it is, the memory area is used more than is necessary.

Figure 6D:
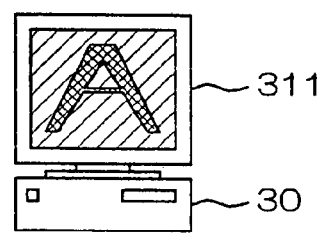
Figure 6E:
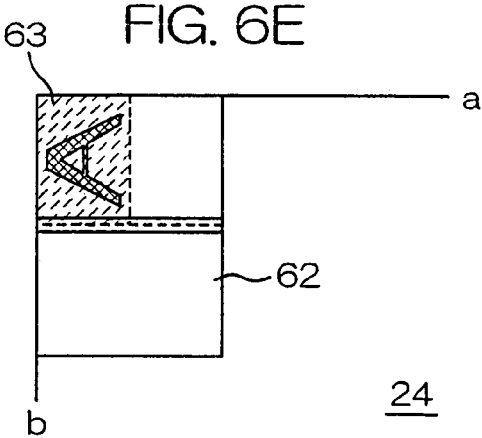

In the system of this embodiment, only the data of the necessary area, that is, the data in the area surrounded by lines a, b, x and y in FIG. 6B, is extracted from the bit map data stored in the BMP 203 by simple instructions from the scanner driver (Step S6 (1), (2)). The extracted data is rearranged so that the image is turned 90 degrees so as to be properly oriented, and then transferred to the RAM 206. The image data in the RAM 206 is such data as illustrated in FIG. 6D, and the data in such a manner is transferred to the computer 30. This makes a secondary processing by the computer 30 unnecessary. The image that has been fetched in the computer 30 in such a manner is given an appropriate file name on a prescribed application screen after exiting from the operation screen, and saved in a prescribed memory area (Step S10).

An A4-sized book is used in the above example. However, also in the case of a small book such as an A5-sized book, properly oriented image data of a necessary area can be easily obtained by setting the book on the scanning window 24 in the manner shown in FIG. 6E. In this case, since the image reading size setting means 501 in the operation screen 5 does not include the corresponding regular size mode, the operator may input the actual length and width by using the custom size mode. As for the original direction setting means 502, the icon 506 may be selected.

Now, a second embodiment is described referring to FIGS. 7, 8, and 9. This embodiment is effective in cases where an end part of the reading area of an original is located inside an end part of the original. In FIG. 9, the read area 71 of an original 70 is located inside the original being X mm away from the left end (actually, the right end, because the original in this Figure is turned over) of the original, and Y mm away from the upper end of the original.

Here, X mm and Y mm correspond to the distance from the left end a and the distance from the innermost end b of the scanning window 24, respectively, in the first embodiment in which the original is placed along the left end a and the innermost end b. According to the main scanning direction A and the subscanning direction B, the scanning starting point in the reading area 71 is P. Given coordinates P (X,Y), it is possible to select any area to read within the original by designating the coordinates of P, the reading size, the configuration of the reading area, and the direction of the image.

In this second embodiment, means for designating a scanning starting location is additionally included in the operation screen of the scanner driver. That is, in the operation screen 6 in FIG. 7, means for designating a scanning starting location 507 is additionally included in the original image setting region 50. In the means for designating a scanning starting location, there are provided an X-coordinate setting section 508 and a Y-coordinate setting section 509 for setting coordinates of the starting point P, and numeral scrolling means 510. By selecting the X-coordinate or Y-coordinate setting section 508 or 509 and operating the numeral scrolling means 510, the numerical value of each of the X-coordinate and Y-coordinate can be set by scrolling. Incidentally, the arrangement of this embodiment is the same as that in FIG. 4 except for the means for designating a scanning starting location 507. Each of the corresponding elements is therefore denoted by the same numeral for the sake of convenience, and explanation thereof is omitted.

FIG. 8 is a flow chart illustrating the operational procedure in the second embodiment. Steps in which processings corresponding to those in the first embodiment are carried out are indicated by the same reference marks, and explanation thereof is omitted. One step that is different from that in the first embodiment is the step S6A, in which setting of the scanning starting location (3) is additionally included when compared with the step S6 in the first embodiment.

As has been described so far, in the second embodiment of the present invention, it is possible to easily obtain properly oriented image data of a necessary area only by designating three conditions, namely, the image size to be scanned, the configuration and direction of the image, and the scanning starting location, no matter where the reading area is located in the original. Also, scanning can be well performed by designating the ending location of scanning instead of the starting location.

Meanwhile, the following modifications maybe possible regarding the first and second embodiments:

(1) In the above embodiments, designation of the scanning image size, the configuration, and the scanning starting location is made by numerical input. However, it is also possible to provide the operation screen with a scanner scanning window region so that it has a function of a digitizer capable of designating the location and the range by cursors and a pointer. Or, the operation screen may be arranged such that such a digitizer screen is popped up by a click on somewhere in the original image setting region. Also, displaying a pre-scanning image of the scanner on the digitizer screen will allow for more precise range specification.

(2) A feeder may also be used, although description thereof is omitted above. In such a case, for example, original width detecting means of the feeder can calculate the innermost end of an original. It is therefore not always necessary to put the original along the innermost side of the scanning window. In addition, since the front end of the original being fed can be calculated from the time when it passed across a passage sensor by using a timer, it is possible to set the front end of the original being fed (the opposite end of the original when it is put on the scanning window) as the basis of calculation so that the reading area and the size can be calculated based on elapse of time on the timer after passage of the front end of the original being fed. Accordingly, the above first and second embodiments will be sufficiently adapted for the use of such a feeder.

(3) The position at which an edge of a stationary original is located when it is set on the scanning window is on the side where the main scanning and subscanning start in the above embodiments. However, it may be on the opposite side. In this case, the operation screen may be provided with change instruction means for changing the calculation basis.

(4) The direction of the original in the original direction setting means of the above embodiments is selectable between two directions, up and left. Down and right may be added thereto.

Figure 10:
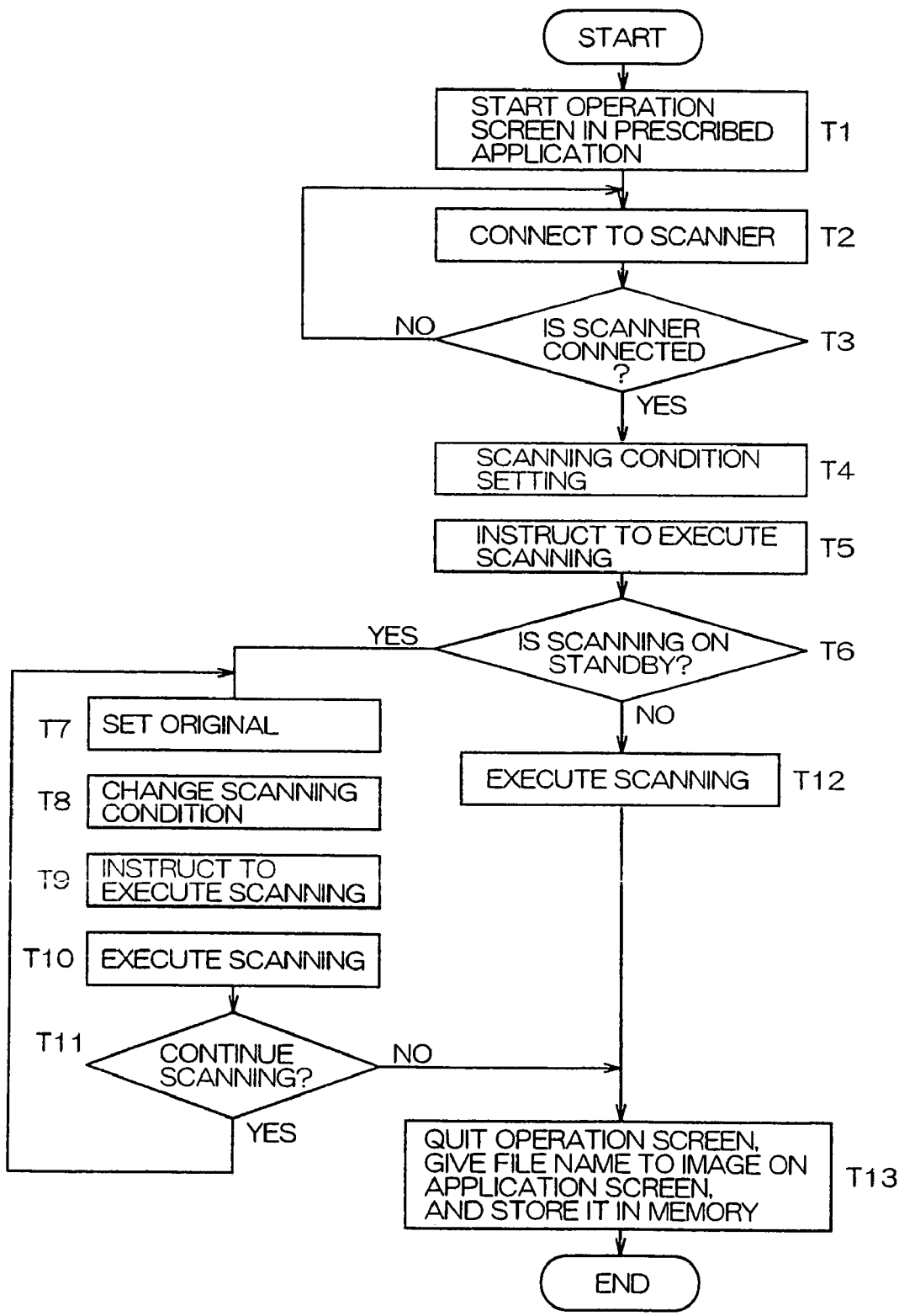
FIG. 10 is a flow chart illustrating the features of a network scanning function in the scanner system according to the first or second embodiment of this invention.

FIG. 10 is a flow chart illustrating the features of a network scanning function. This network scanning function may be combined with either one of the first and second embodiments above.

Figure 11:
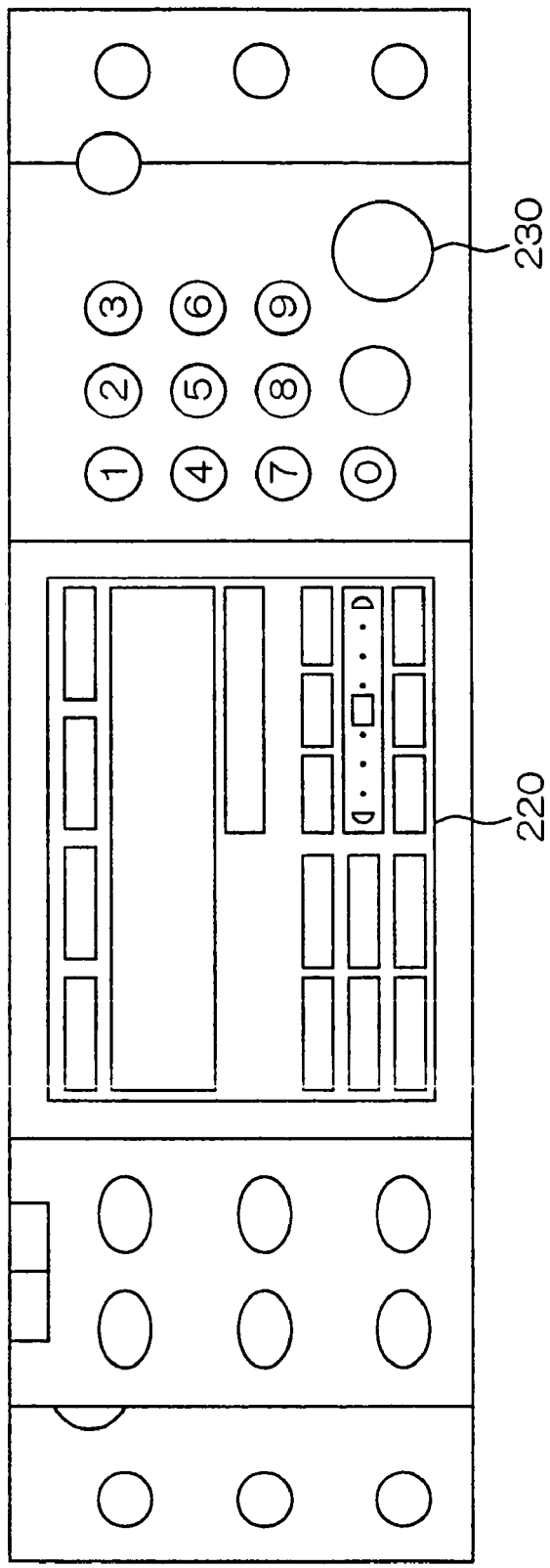
FIG. 11 is a diagram showing the operation section of a digital duplicator as a scanning device.
Figure 12:
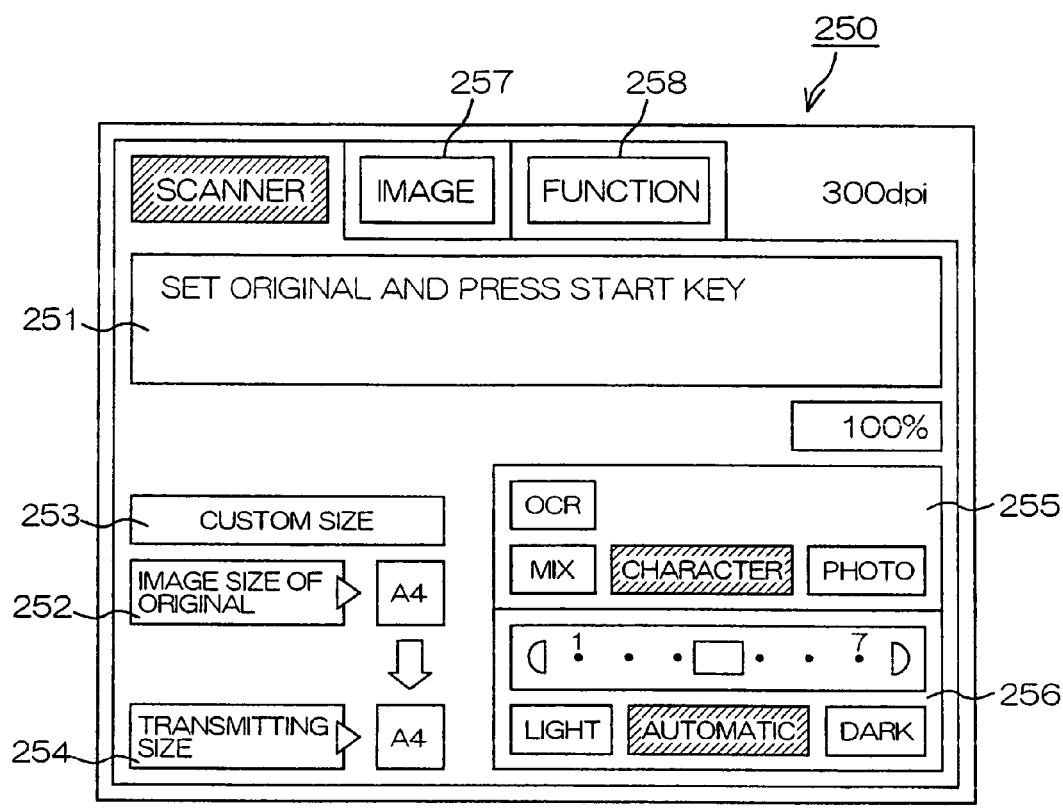
FIG. 12 is a diagram showing a specific example of the image shown on the display panel in the operation section of the device in FIG. 11, which is an example of the scanner setting screen displayed upon scanning standby operation.

In FIG. 10, an operation flow including a scanning standby setting is shown. In order to explain operations on the side of the digital duplicator 1 (scanner 20) in a scanning standby state, FIG. 11 illustrating a general view of its operation section 204 and FIG. 12 illustrating a display screen of the operation section 204 in the scanning standby mode are also referred to in combination with FIG. 10.

First, the operation screen 5 or 6 (FIG. 4 or FIG. 7) of the scanner driver is activated from a prescribed application on the computer 30 (Step T1). Then, following an instruction displayed on the status displaying section 561 in the operation screen 5 or 6, the connection execution key 562 is pressed so as to connect the driver to the scanner section of the digital duplicator 1 (Step T2). The status displaying sections 561 in FIGS. 5 and 6 indicate an instruction, "CONNECT TO SCANNER". When the digital duplicator 1 is being used for copying or the like, the operator waits until it is completed and then presses the connection execution key 562 again so as to complete the connection (Step T3). At this stage, the status displaying section 561 of the screen 5 (6) indicates "READY TO SCAN".

Subsequently, setting of various scanning conditions for the original is carried out (Step T4). In this step, on the operation screen 5 (6) in FIG. 4 (7), setting of the reading size by the image reading size setting means 501, and setting of the original direction by the original direction setting means 502 are carried out in the original image setting region 50, and setting of the transmitting size by the transmitting size setting means 521 is carried out in the transmitting size setting region 52. In addition, setting of the original mode by the original mode setting means 541, setting of the resolution by the resolution setting means 545 and setting of the density by the density setting means 550 are carried out in the scanning mode setting region 54. Here, the conditions have been set as in FIG. 4. Additionally, in the case of using the feeder 22, either the automatic mode 543 or the one-by-one mode 544 is selected in the scanner operation setting section 542, and the side for scanning is selected by the one side/both sides setting means 546. Then, the checkbox of the scanning standby setting section 563 in the status region 56 is checked by the pointing device 310 so as to set a scanning standby mode. Upon completion of these settings, the scanning execution key 562 on the operation screen 5 is pressed, when a message, "NOW SCANNING", is indicated on the status display section 561 (Step T5). At this stage, the digital duplicator 1 has the scanner section 20 being in a scanning standby state (Step T6).

When the scanning execution key 562 is pressed in the step T5, the information on the various conditions that have been set in the step T4 together with a scanning execution signal and a scanning standby instruction signal are transmitted from the network I/F section 301 of the computer 30. These signals are received by the network I/F section 201 of the digital duplicator 1 via the network 40 and temporarily stored in the RAM 206. Here, the CPU 205 of the digital duplicator 1 follows the scanning standby signal so as to keep the scan execution instruction from being transmitted to the scan I/F (keep the scanning standby state) (Step T6). Also, the CPU 205 sends an instruction for displaying the scanner setting screen (scanning condition changing means) to the display section 204. In this scanner setting screen, according to the data of various condition settings that has been received, the conditions set in the step T4 are displayed as initial conditions.

Subsequently, the operator moves to the side of the digital duplicator 1 carrying an original. At this stage, the display panel 220 (FIG. 11) in the operating section 204 of the digital duplicator 1 follows the instruction from the CPU 205 for displaying the scanner setting screen so as to be in the state shown in FIG. 12 (scanner setting screen 250) The message display section 251 on the scanner setting screen 250 displays a message reading "SET ORIGINAL AND PRESS START KEY." Following the instruction, the operator sets the original on the scanning window 24 of the original-placing table 23 in the scanner section 20, or in the feeder 22 (Step T7). At this stage, if there is no need to change the settings made on the operation screen 5 (6) of the computer 30, the operator is to press the start key 230 (scan initiating means) in the operation section 204 in FIG. 11 so that the CPU 205 releases the scan execution instruction from the state in which it is kept from being transmitted to the scan I/F 202 (the scanning standby state), and transmits the scan execution instruction to the scan I/F 202 (Step T9). This makes the scanner section 20 start scanning operation, and the scanned image is subjected to a prescribed digital conversion so as to be transferred from the digital duplicator 1 to the computer 30 via the network 40 (Step T10).

On the other hand, when it is necessary to change the setting(s) made on the operation screen 5 (6) of the computer 30 due to erroneous setting or the like, changing can be carried out on the scanner setting screen 250 in the display panel 220. For example, when the reading size needs to be changed, it can be changed by using the original image size setting means 252 or the custom size setting means 253. When changing the transmitting size is necessary, the transmitting size setting means 254 can be used for that purpose. When the operator wishes to change the error dispersion level at scanning, it can be changed by using the original mode setting means 255. The scanning density can be changed by the density setting means 256. In addition, the resolution or the like can be varied by selecting the image setting tab 257. It is also possible to add a frame-erasing function and a dividing function by selecting the function adding tab 258 (Step T8)

After changing some setting on the scanner setting screen 250, when the operator presses the start key 230 in the operation section 204, the data of the condition settings in the RAM 206 is overwritten by the varied condition data. The CPU 205 transmits a scan execution instruction based on the varied conditions to the scan I/F 202 (Step T9). Then, the scanner section 20 starts the scanning operation, by which the original is scanned under the varied scanning conditions and the data is transferred to the computer 30 (Step T10)

As described so far, in this scanner setting screen 250, according to the data of various condition settings that have been transmitted from the computer, the conditions set in the step T4 are displayed as the initial conditions. Accordingly, when the start key 230 is pressed with the conditions unchanged, scanning is carried out without changing the set conditions. When the start key 230 is pressed after changing the conditions on the scanner setting screen, scanning is carried out under the varied conditions. Meanwhile, FIG. 12 shows a state in which the settings have been done according to the setting conditions that have been transmitted from the computer 30 and temporarily stored in the RAM 206 of the digital duplicator 1 (the state of the operation screen 5 in FIG. 4), that is, the initial conditions.

Figure 13:
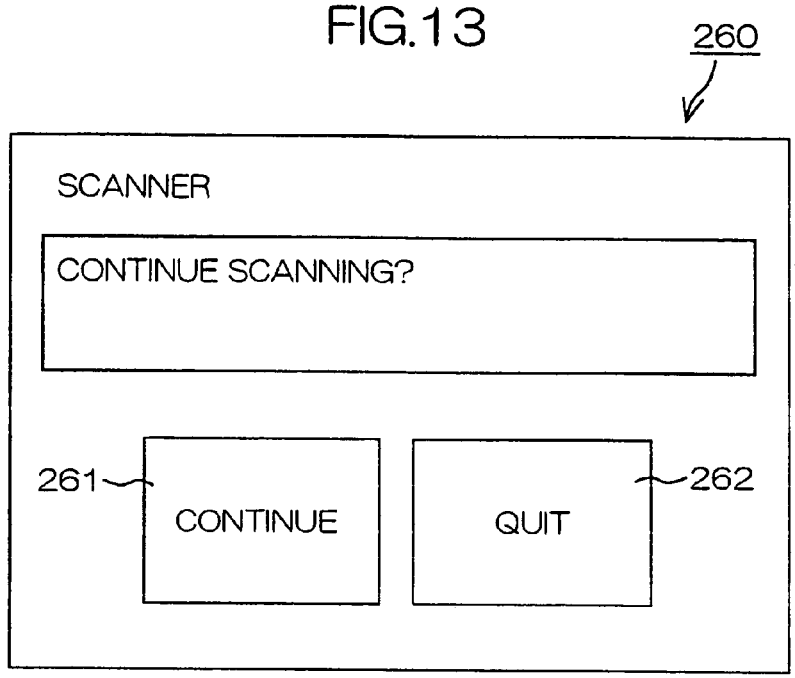
FIG. 13 is a pattern diagram showing a specific example of the image shown on the display panel in the operation section of the device in FIG. 11, which is an example of the continuation/completion selecting screen displayed upon scanning standby operation.

Upon completion of the scanning, the CPU 205 transmits an instruction for displaying a screen for selecting continuation/completion to the operation section 204, and the display panel 220 displays the continuation/completion selection screen 260 (FIG. 13) according to the instruction for displaying the same from the CPU 205. When scanning needs to be continued because of an additional original to be scanned or the like, the operator sets the additional original in the scanner section 20 and selects the continuation key 261, when the display panel 220 returns to the scanner setting screen 250, by which scanning can be restarted. When continuation of scanning is not necessary, the operator presses the completion key 262 so that the display panel 220 returns from the continuation/completion selection screen 260 to the copy-mode initial screen (not shown) (Step T11).

As described above, because scanning operation can be carried out on the side of the digital duplicator 1 in this embodiment, when scanning an original such as a book having a binding part that is likely to be apart from the scanning window, the operator has it scanned while pressing the backside of the book against the scanning window. Another cooperator is therefore unnecessary. In addition, this embodiment enables the operator to bring the original back after the scanning so as not to leave it as an obstacle for other operators. Accordingly, it is not necessary to travel to and from the duplicator for withdrawing the original.

After the operation screen is terminated, the image that has been fetched in the computer 30 in the step T9 is given an appropriate file name on the application screen, and stored in a prescribed memory area (Step T13). The above explanation refers to a case where the scanning standby mode has been set. When an original has been set in the scanner section 20 and the scanning standby mode is not to be set, the operator presses the scanning execution key 562 so that the data of the various conditions set in the step T4 together with a scanning execution signal are transmitted to the digital duplicator 1. According to the scanning execution signal, the CPU 205 of the digital duplicator 1 gives a scan execution instruction based on the set various conditions to the scan I/F (Steps T5, T6). By this, scanning is immediately carried out, and the scanned image is subjected to a prescribed digital conversion so as to be transferred from the digital duplicator 1 to the computer 30 via the network 40 (Step T12). In this case, the operator is spared the traveling to the digital duplicator 1 for executing scanning.

Figure 14:
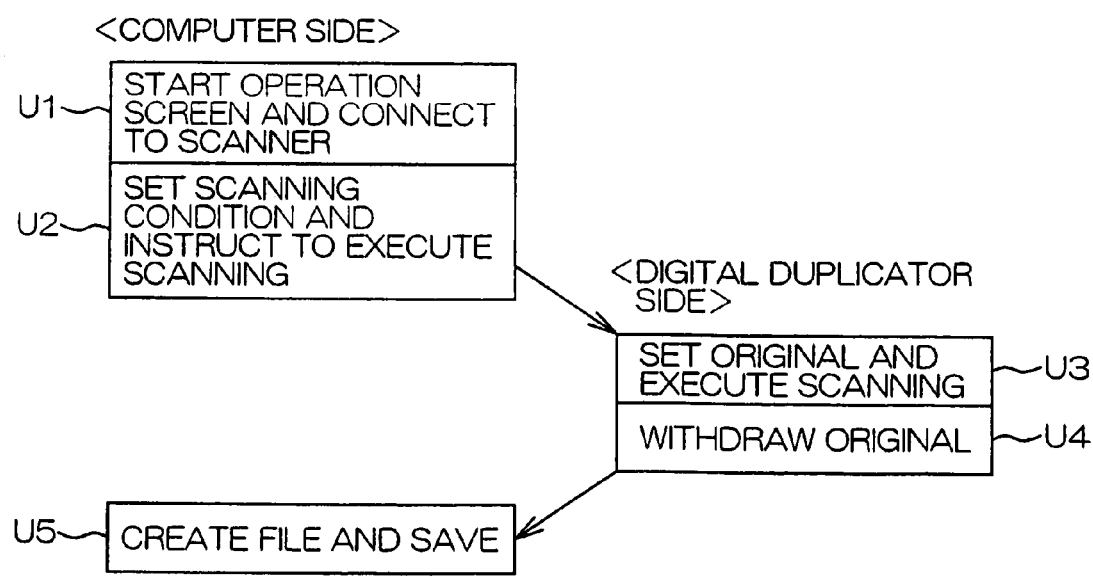
FIG. 14 is a flow chart showing an example of the flow of original scanning process in the above scanner system, along with the movement of the operator during the process.
Figure 15:
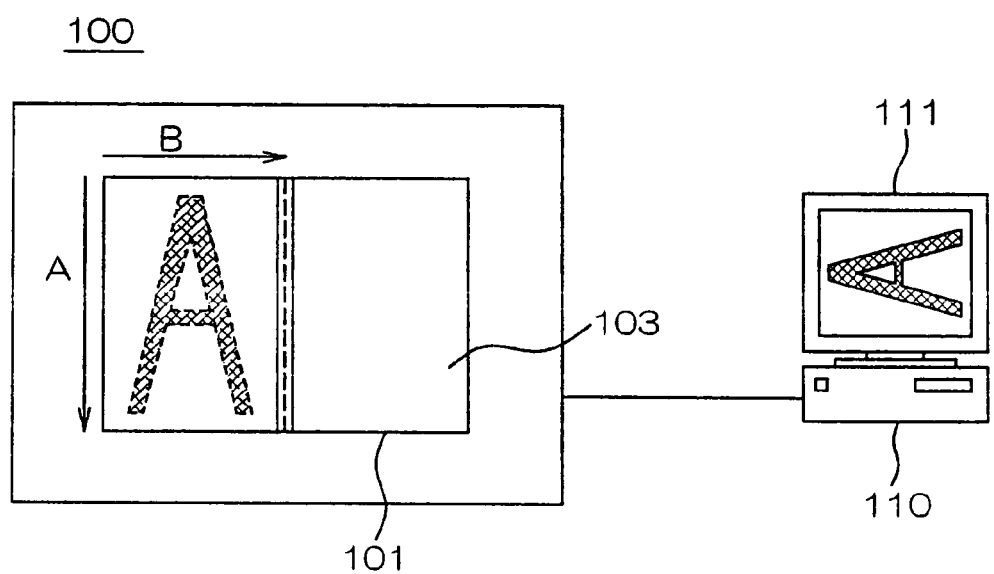
FIG. 15 is a diagram for illustrating one of the problems that the present invention intends to solve.

FIG. 14 is a chart illustrating the operational flow in the case of setting the scanning standby mode shown in FIG. 10, which is simplified by dividing the operations into operations on the side of the computer 30 and those on the side of the digital duplicator 1. First, activation of the operation screen 5, connection to the scanner section 20 (Step U1), setting of various scanning conditions and directing a scan execution instruction(Step U2) are successively carried out on the computer 30 side. Then, the operator moves to the side of the digital duplicator 1 so as to successively carry out setting of an original, directing a scan execution instruction (Step U3), and withdrawing the original (Step U4). Finally, the operator returns to the computer 30 side to create a file of the scanned image and save it (Step U5).

Figure 16:
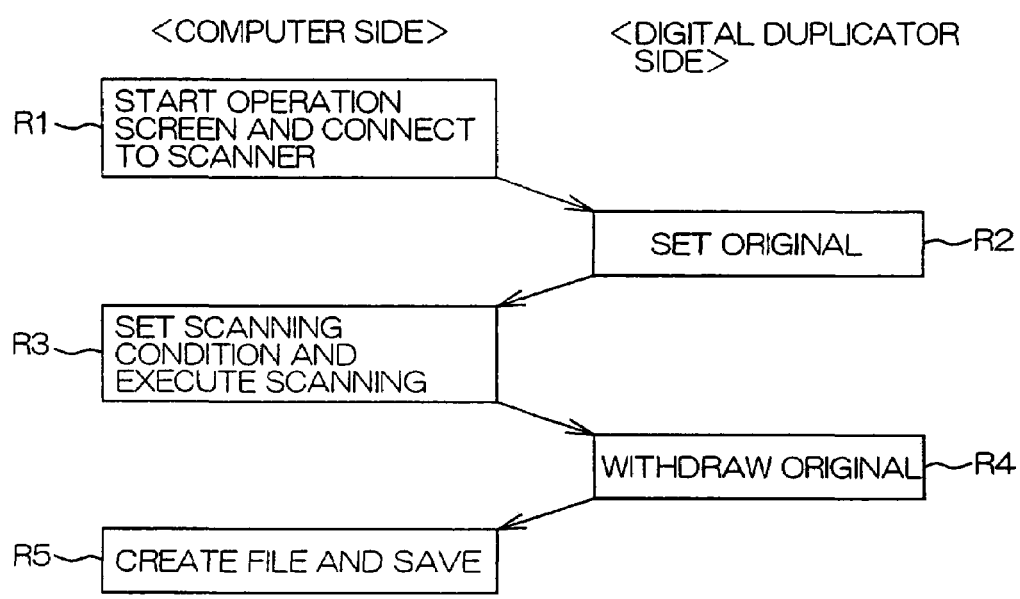
FIG. 16 is a flowchart for illustrating one of the problems that the present invention intends to solve, which shows an example of the flow of operation along with the movement of the operator during the operation.

As discussed so far, in this embodiment, the operator needs to move only twice so that the operational efficiency is greatly improved compared with the example of a conventional kind in FIG. 16. In addition, even when scanning a book-style original that needs to be kept pressed by hand from its backside during the scanning in order to get the binding part scanned, it is not necessary to increase the number of traveling times, and the scanning operation can be well performed by one operator, so that laborsaving can be accomplished.

Preferred embodiments of the present invention have been described so far in detail. However, these are examples intended only to illustrate the technical features of this invention, and the present invention should not be construed as limited to these examples. The spirit and scope of the present invention are to be determined solely by the appended claims.

This application is based on Japanese applications Nos. 2000-262075 and 2000-316368 filed on Aug. 31, 2000, and Oct. 17, 2000, respectively, the entire contents of which are incorporated hereinto by reference.

The invention claimed is:

1. A scanner system comprising an image scanner for scanning an original and creating image data representing the original and a control device for controlling the image scanner, wherein:

the control device includes scanning instruction means having:

means for generating a scan execution instruction causing the image scanner to execute scanning of the original, the scan execution instruction generating means including means, responsive to an operator manual input, for bringing the scan execution instruction into a standby state, and transmission means for transmitting the scan execution instruction to the image scanner; and the image scanner includes:

a scanning unit, receiving means for receiving the scan execution instruction that has been brought into the standby state from the transmission means, scan initiating means for accepting operator manual input, and a control unit, responsive to operator manual input accepted by the scan initiating means, for releasing the standby state of the scan execution instruction received by the receiving means from commanding the standby state, and for causing the scanning unit to initiate scanning of the original.

2. The scanner system according to claim 1, wherein the control device further includes scanning condition setting means for accepting input for setting a scanning condition in the image scanner, and wherein the scanning instruction means designates the scanning condition and transmits a scan execution instruction.

3. The scanner system according to claim 2, wherein the image scanner further includes scanning condition changing means for accepting input for changing the scanning condition that has been designated by the control device.

4. A scanner driver intended for installation in a computer connectable to an image scanner for scanning an original and generating image data representing the original in order to computer control the image scanner, wherein upon loading of the scanner driver into the computer, the computer becomes configured so as to include a scanning instruction means including:

means for generating a scan execution instruction causing the image scanner to execute scanning of the original, the scan execution instruction generating means including means, responsive to an operator manual input, for bringing the scan execution instruction into a standby state; and transmission means for transmitting the scan execution instruction to the image scanner;

the image scanner including:

a scanning unit, a receiving means for receiving the scan execution instruction that has been brought into the standby state from the transmission means, scan initiating means for accepting operator manual input, and a control unit, responsive to operator manual input accepted by the scan initiating means, for releasing the standby state of the scan execution instruction received by the receiving means commanding the standby state, and for causing the scanning unit to initiate scanning of the original.

5. The scanner driver according to claim 4, wherein upon loading of the scanner driver into the computer, the computer further forms scanning condition setting means for accepting input for setting a scanning condition in the image scanner, and wherein the scanning instruction means designates the scanning condition and transmits a scan execution instruction.

6. A computer-readable recording medium having scanner driver code stored therein, the medium being intended to be read and executed by a computer so that the computer can control an image scanner connectable to the computer for scanning image data of an original, wherein upon loading of the scanner driver into the computer, the computer forms scanning instructing means including:

means for generating a scan execution instruction for causing the image scanner to execute scanning of the original, the scan execution instruction generating means including means, responsive to an operator manual input, for bringing the scan execution instruction into a standby state; and transmission means for transmitting the scan execution instruction to the image scanner;

the image scanner including:

a scanning unit, a receiving means for receiving the scan execution instruction that has been brought into the standby state from the transmission means, scan initiating means for accepting operator manual input, and a control unit, responsive to operator manual input accepted by the scan initiating means, for releasing the standby state of the scan execution instruction received by the receiving means commanding the standby state, and for causing the scanning unit to initiate scanning of the original.

7. The recording medium according to claim 6, wherein upon loading of the scanner driver into the computer, the computer further forms scanning condition setting means for accepting input for setting a scanning condition in the image scanner, and wherein the scanning instruction means designates the scanning condition and transmits a scan execution instruction.

* * * * *